Patented July 14, 1931

1,813,936

UNITED STATES PATENT OFFICE

PHILIP ADOLPH KOBER, OF EVANSTON, ILLINOIS, ASSIGNOR TO G. D. SEARLE & COMPANY, OF CHICAGO, ILLINOIS, A CORPORATION OF ILLINOIS

MINERAL FOOD COMPOSITION AND PROCESS OF MAKING SAME

No Drawing.   Application filed May 19, 1927. Serial No. 192,800.

This invention relates to an improved composition of mineral food, especially intended for the use of human beings, and a process of making the same.

A principal object of the invention is to produce a composition containing phosphates and salts of calcium and magnesium, all in soluble form and capable of being brought into solution without forming insoluble precipitates.

A further object of the invention is to produce a composition containing soluble calcium and magnesium salts, and soluble hydroxides or phosphates and hydroxides, in soluble form and capable of being brought into solution without forming insoluble precipitates.

Still another object of the invention is to produce a composition containing salts of calcium and magnesium and capable of forming a slightly alkaline solution free from insoluble calcium and magnesium compounds.

Recent biochemical work has shown the importance of the mineral elements to the well being and growth of the body. It has also been shown that these mineral elements can be assimilated from their simple inorganic and organic salts. In my previous application Serial No. 90,970, filed Feb. 26, 1926, it has been shown that a composition containing the thirteen mineral elements now recognized as essential to the body can be prepared in a soluble, physiologically acceptable, palatable form.

One of the important problems in making mineral foods, aside from making them physiologically acceptable and palatable, is that of maintaining calcium and magnesium salts in solution in the presence of phosphates and alkalies, or alkali compounds, because of the well known tendency to form insoluble calcium and magnesium phosphates and hydroxides, in which insoluble form they are prevented from being absorbed from the intestinal tract as easily as if these compounds were soluble and remained in solution in the presence of the weakly alkaline fluids of the upper intestinal tract. In the practice of medicine also it is sometimes desirable to inject, intravenously or hypodermically, salts of calcium, magnesium and phosphorus, as well as salts of other mineral elements in a soluble neutral or slightly alkaline solution. Heretofore, this has been difficult or impossible with a single solution containing these mineral elements, owing to the tendency for these insoluble phosphates and hydroxides to form. In my patent application above mentioned, one method of preparing such a mixture of soluble salts is disclosed.

According to the present method, calcium and magnesium salts are kept in the presence of phosphates, or compounds of phosphates, or hydroxides, or any or all of these, by using lactate solutions, preferably the alkali metal lactate solutions, as a menstrum. The remarkable thing about this method is that it enables one to prepare a neutral or slightly alkaline solution containing calcium, magnesium, phosphorus and other mineral elements, so that its administration orally and intravenously is possible with a hydrogen ion concentration favorable to human use. As is well known, calcium and magnesium ordinarily are precipitated as hydroxides in an alkaline solution. However, my investigations show that the presence of sodium lactate in the composition prevents the formation of insoluble hydroxides as well as phosphates even in a slightly alkaline solution.

This discovery of the protective action of sodium lactate is all the more welcome as sodium lactate is a physiologically acceptable substance even for small infants, as is shown by the large use of lactic acid in infant milk feeding, to secure pre-coagulation of proteins, increased acidity for peptic digestion, and increased peristalsis.

While I have referred to sodium lactate, and this is preferred because of its cheapness and ready availability, it is to be understood that other alkali metal lactates and, in fact, any other physiologically acceptable lactate may be used and this is true whether the basic part be of an organic or inorganic nature. The use of this lactate method of producing soluble preparations of calcium, magnesium and phosphate compounds, as well as of other mineral elements common to the body, may of course be varied considerably depending upon the aim and necessity in each case. For some purposes, for example in the treatment of certain deficiency diseases such as rickets, it may be desirable to use only salts of calcium, magnesium and phosphorus. For other purposes, for example in the treatment of general malnutrition, it may be desirable to administer other mineral elements necessary to the body, in which case suitable proportions of the soluble salts of such additional elements may be added to the composition. Variations in the proportions of the salts in the composition and in the concentrations of the solutions produced therefrom may be made without deviating from the scope of the invention.

The following will illustrate a procedure which may be followed in forming a solution of salts of calcium and phosphorus:

4.0 grams of calcium lactate, calcium chloride or other suitable calcium salt, are dissolved in 40 cc. of water.

10.0 grams of sodium lactate, or any other suitable lactate, are dissolved in 5 cc. of water.

5.0 grams of di-sodium phosphate or equivalent of potassium or any other suitable phosphate or phosphate derivative, such as glycero- or lacto-phosphate, are dissolved in 50 cc. of water, and the hydrogen ion concentration of the solution adjusted, by means of slight additions of acids or alkalies, so that the solution has a pH of not over 8. The three solutions are now mixed, adding that containing the phosphate last. The final solution should be of a hydrogen ion concentration of not over 8, and may require the addition of acid or alkali to insure this. Neutral red is a suitable indicator for this purpose as it turns from yellow to orange when the hydrogen ion concentration is 8.

If it is desired to prepare the composition in solid form, the dry acids such as citric or tartaric, or if necesary dry alkalies such as sodium carbonate or sodium bicarbonate in such amount that the final solution will have a pH of not over 8 may be added to a mixture of the salts. The amount of acid or alkali required to produce the desired hydrogen ion concentration in the final solution may be determined by a preliminary test with solution of the substances to be used. According to another method of carrying out the invention, all the salts with the exception of the sodium lactate or other lactate used, may be mixed dry with such quantities of acid or alkali as will produce the desired hydrogen ion concentration i. e., a pH of not over 8, and then, when it is desired to use the mixture, it may be dissolved in a sodium lactate or other aqueous lactate solution.

The amount of sodium lactate necessary to prevent the formation of insoluble compounds depends upon the concentration of the individual salts, their relative proportions, the hydrogen ion concentration as it approaches a pH of 8, and the length of time it is desired to keep these substances from precipitating. Solutions having the proportions given above have stood for weeks without a sign of precipitation, and there is no reason to believe that they will ever precipitate, except through the deterioration of the lactates due to bacterial or other action. This conclusion seems sound particularly in view of the fact that freshly formed precipitates of calcium and magnesium phosphates and hydroxides can be dissolved by neutral lactates.

A mixture of the following substances in the proportions set forth and prepared in accordance with the method hereinafter described, constitutes a complete mineral diet suitable for human food and the other uses mentioned herein:

| | Grams |
|---|---|
| Potassium citrate | 279 |
| Sodium glycerophosphate | 620 |
| Calcium lactate | 397 |
| Magnesium lactate | 105 |
| Sodium chloride | 193 |
| Iron and ammonium citrate | 14.2 |
| Potassium iodate | 11.3 |
| Alum | 1.4 |
| Sodium silicate | 1.8 |
| Manganese hypophosphite | 1.4 |
| Sodium fluoride | .35 |
| | 1624.45 |

These substances are ground into a fine powder and mixed and a sample tested for the hydrogen ion concentration when dissolved, and the amount of acid or alkali calculated for the remaining part so that when dissolved the pH is not over 8.

Ten parts of this mixture are dissolved in 100 parts of water containing 10 parts of sodium lactate or any other suitable lactate, and is ready for use. If desired, a suitable dry lactate in the amount of 1600 grams, or even less, can be added to the above mixture and the whole dissolved in water as needed, provided the mixture on dissolving shows a pH of not over 8. The proportion of lactate given above seems to keep the solutions from precipitating indefinitely, and if the solutions are not required to keep long the amount of lactate can be reduced considerably.

It is of course obvious that some substitutions and changes in proportion can be made by one skilled in physiclogical chemistry, for physiological or economic reasons, and still serve a useful purpose in mineral nutrition. Also, if desired, the composition may be added to milk, fruit juices, broths, or other foods as a reinforcement in the mineral diet, or as a vehicle of administration.

Lactate may also be added in the form of lactic acid to a mixture of substances containing bases, as for example alkali metal carbonates and bicarbonates, capable of forming lactates, and still function according to the disclosure here made. Likewise, partially formed lactates, or what might be considered as a mixture of lactates and lactic acid may be used to give an acidity for the purposes of taste, pre-coagulation of proteins, acidity for peptic digestion, increased peristalsis, etc., as for example in infant feeding, and yet obtain the protective action of lactate herein described.

I claim:

1. Process of making a mineral food which consists in adding a soluble alkali metal lactate to a mixture containing soluble alkaline earth and phosphate compounds to prevent the formation of insoluble compounds when the said mixture is dissolved in an aqueous medium.

2. Process of making a mineral food which consists in adding an alkali metal lactate to a mixture containing soluble calcium and magnesium compounds and a soluble phosphate to prevent the formation of insoluble compounds when the said mixture is dissolved in an aqueous medium.

3. Process of making a mineral food containing alkaline earth and phosphate compounds in soluble form and retaining their solubility when dissolved in an aqueous medium, comprising mixing soluble salts of the desired alkaline earth and phosphate, and a soluble alkali metal lactate, and adjusting the alkalinity of the resulting mixture by additions of a weak acid or a soluble carbonate sufficient to cause the solution having such mixture dissolved therein to show a hydrogen ion concentration of less than 8.

4. Process of preparing a solution to be taken internally as human food and containing alkaline earth and phosphate compounds, comprising mixing soluble alkaline earth and phosphate compounds and a soluble alkali metal lactate all in solid form, and then dissolving such mixture in an aqueous medium.

5. Process of preparing an alkaline solution to be taken internally as a human food and containing alkaline earth salts in soluble form, comprising mixing a soluble alkali metal lactate with a soluble alkaline earth salt, bringing the mixture into solution, and making suitable additions to the solution to produce a pH of not over 8.

6. Process of preparing a solution to be taken internally as human food and containing in solution alkaline earth salts and soluble hydroxides, comprising mixing such salts and hydroxides, adding a soluble alkali metal lactate, and then dissolving the mixture in an aqueous medium.

7. A mineral food containing alkaline earth and phosphate compounds in soluble form, and a soluble alkali metal lactate inhibiting the formation of insoluble alkaline earth compounds when the mixture is dissolved in an aqueous medium.

8. A mineral food containing alkaline earth and phosphate compounds in soluble form, and an alkali metal lactate inhibiting the formation of insoluble alkaline earth compounds when the mixture is dissolved in an aqueous medium.

9. A solution to be taken internally as a human food containing alkaline earth salts, soluble hydroxides, and a soluble alkali metal lactate inhibiting the formation of insoluble alkaline earth compounds.

10. A solution to be taken internally as a human food having a hydrogen ion concentration of not over 8 and containing alkaline earth salts, soluble hydroxides, and a soluble alkali metal lactate inhibiting the formation of insoluble alkaline earth compounds.

11. A mineral food containing soluble salts of calcium and magnesium, soluble phosphates, and a soluble alkali metal lactate inhibiting the formation of insoluble alkaline earth compounds when the mixture is dissolved in an aqueous medium.

12. A mineral food containing soluble salts of calcium and magnesium, soluble phosphates and sodium lactate.

13. A mineral food containing soluble salts of calcium and magnesium, soluble phosphates, and a soluble alkali metal lactate inhibiting the formation of insoluble alkaline earth compounds when the mixture is dissolved in an aqueous medium, and suitable additions to adjust the alkalinity of the solution obtained by dissolving said mixture in an aqueous medium to a hydrogen ion concentration of not exceeding 8.

In testimony whereof, I have signed my name to this specification this 16th day of May, 1927.

PHILIP ADOLPH KOBER.